United States Patent [19]
Takeda et al.

[11] Patent Number: 6,024,499
[45] Date of Patent: Feb. 15, 2000

[54] OPTICAL FIBER CONNECTORS

[75] Inventors: Nobutoshi Takeda; Tohru Mizuhashi; Kazuo Watanabe, all of Funabashi, Japan

[73] Assignees: Mimaki Electronic Component Co., Ltd., Nagano-Ken; TM Enterprise Co., Ltd., Chiba Prefecture, both of Japan

[21] Appl. No.: 08/879,043

[22] Filed: Jun. 19, 1997

[30] Foreign Application Priority Data

Jun. 20, 1996 [JP] Japan ................................ 8-195165

[51] Int. Cl.$^7$ ..................................................... G02B 6/38
[52] U.S. Cl. ............................. 385/79; 385/61; 385/85; 385/33
[58] Field of Search ................................ 385/61, 79, 85, 385/35, 33

[56] References Cited

U.S. PATENT DOCUMENTS

| | | | |
|---|---|---|---|
| 5,432,880 | 7/1995 | Diner | 385/85 |
| 5,687,269 | 11/1997 | Furuya et al. | 395/85 |
| 5,734,769 | 3/1998 | Lu | 385/61 |

*Primary Examiner*—Hung N. Ngo
*Attorney, Agent, or Firm*—Wenderoth, Lind & Ponack, L.L.P.

[57] ABSTRACT

Disclosed is an optical fiber connector for ultra high-speed communication which can be produced by easy machining procedures and which enables stable and efficient transmission. The connector comprises a columnar ferrule having a through hole in which a connection end portion of an optical fiber is retained, a tapered portion serving as a connection guide and assuming a conical face formed at the and of the ferrule, and a convex spherical face formed at the end of the tapered portion. An intersection of the convex spherical face and the axis of the ferrule forms a reference abutment point. A straight line passing through this reference abutment point and angled with respect to the ferrule axis forms a reference normal intersecting orthogonal to the convex spherical face. When the cone axis of the tapered portion is within a vertical cross section taken along the ferrule axis and containing the reference normal and an abutment line intersecting with the reference normal at the reference abutment point, the position of the tapered portion is such that a central point of a segment defined on the abutment line as being surrounded by the conical face of the tapered portion may locate on the ferrule axis.

4 Claims, 4 Drawing Sheets

OPTICAL FIBER CONNECTORS

BACKGROUND OF THE INVENTION

1. Filed of the Invention

The present invention relates generally to an optical fiber connector to be employed at junctions of optical communication fibers. In particular, the invention relates to an optical fiber connector which can easily secure dimensional accuracy required for ultra high-speed communication.

2. Description of the Related Art

Optical fiber connectors to be employed for connecting optical communication fiber cables are required to have reduced insertion loss and reduced return light loss, in order to secure transmissibility. Accordingly, ferrules which retain end portions of optical fibers, having, for example, a flat or convex spherical abutment face at the distal end are employed depending on the transmission performance.

An optical fiber connector employed for connecting ultra high-speed communication optical fibers (such as for image transmission) has a slant convex spherical face as shown in FIG. 3, which illustrates connector ends each having a slant convex spherical face, which are abutted against each other. The slant convex spherical faces 101 can bring end faces of two opposing optical fibers 102 into direct contact with each other at a point 103 on the optical axes f of the optical fibers 102. Further insertion loss and return light loss can be reduced by tilting the abutment plane 104 in contact with the convex spherical faces 101 at this abutment point 103. The reference number 106 shows a ferrule for retaining the optical fiber 102 at the end of the optical fiber connector.

Meanwhile, the optical fiber connector has a conical tapered portion 107 around the periphery of the slant convex spherical face 101 at the end of the columnar ferrule 106 as shown in FIG. 4, in which the connector shown in FIG. 3 is tapered at the and. This slant convex spherical face 101 is employed as a fiber connection guide and is formed such that the apex 108 of the spherical face may be located at a position offset from the axis f of the ferrule corresponding to the optical axis when the slant convex spherical face 101 is subjected to spherical polishing employing an ordinary elastic polishing plate.

The reason is as follows. According to the conventional spherical polishing treatment employing an elastic polishing plate, a material to be polished is subjected to polishing at the end face of a protruded portion as a reference shape. Thus, a high-accuracy polished spherical face having an apex at the center of the upper end face can easily be formed with an angle of inclination of the abutment plane 104 being secured at the apex of the spherical face.

Meanwhile, referring to the central point at the end face of the protruded portion having a polished reference shape, since the abutment plane 104 is angled, the central point 108 of the protruded portion 104a, which is formed by the abutment plane 104 and the conical face 107a of the tapered portion 107, is offset from the ferrule axis f corresponding to the optical axis.

A polished spherical face is formed with the central point 108 as the apex. Therefore, the apex 108 of the slant convex spherical face 101 (formed based on the abutment plane 104) contains an error corresponding to the deviation E from the point 109 on the ferrule axis f.

This deviation of the apex induces reduction in transmissibility, so that these optical fiber connectors cannot be employed for connecting optical fibers for ultra high-speed communication. In addition, the deviation increases as the depth of polishing achieved by the elastic polishing plate is increased, and it cannot be eliminated even by adjustment of the polishing treatment.

In order to obviate this deviation of the apex, there is proposed a method of polishing the ferrule by rotating the elastic polishing plate with the point 109 on the ferrule axis f as the center of rotation, or a method as shown in FIG. 5, in which a columnar portion 110 having a reduced diameter is formed at the end of the tapered portion 107, and a slant convex spherical face 101 is formed at the end of this reduced-diameter columnar portion 110.

However, in the former polishing method, where the elastic polishing plate is rotated about the point 109 on the ferrule axis f so as to coincide with the apex of the spherical face, a special polishing device requiring accuracy of the rotational shaft and microscopic high-accuracy positioning is required. In the latter polishing method, where a reduced diameter columnar portion is provided between the tapered portion and the slant convex spherical face, the steps of processing the ferrule are complicated, and the rigidity at the end of the ferrule is reduced since the reference abutment point is present at the end of the reduced-diameter columnar portion protruding from the tapered portion. This may lead to problems in durability, including unstable transmission.

SUMMARY OF THE INVENTION

It is an objective of the present invention to provide an optical fiber connector for ultra high-speed communication which can be produced by easy procedures and can achieve stable and efficient transmission.

In order to solve the problems described above, there is provided an optical fiber connector comprising a columnar ferrule having a through hole in which a connection end portion of an optical fiber is retained, a tapered portion serving as a connection guide and assuming an imaginary conical face formed at the end of the ferrule, and a convex spherical face formed at the end of the tapered portion. An intersection of the convex spherical face and the axis of the ferrule is a reference abutment point. A straight line passing through this reference abutment point and angled with respect to the ferrule axis is a reference normal intersecting orthogonally to the convex spherical face. When the cone axis of the tapered portion is within a vertical cross section taken along the ferrule axis and containing the reference normal and an abutment line intersecting the reference normal at the reference abutment point, the position of the tapered portion is defined such that a central point of a segment defined on the abutment line as being surrounded by the conical face of the tapered portion may locate on the ferrule axis.

The central point of the segment which is on the abutment line intersecting the reference normal at the reference abutment point and which is defined as being surrounded by the conical face of the tapered portion, is taken as being on the ferrule axis. Therefore, if a spherical face is formed by polishing with an elastic polishing plate based on the slant trapezoid (as a reference shape) defined by the conical face of the tapered portion and the abutment plane (assuming a tilted face), a spherical face having an apex at the central point of the segment (defined on the abutment line as being surrounded by the conical surface of the tapered portion) can be formed. Accordingly, a convex spherical face having an apex at the reference abutment point, i.e., a convex spherical face having the reference normal at the reference abutment point, can be obtained.

In the optical fiber connector described above, the reference abutment point is on the ferrule axis of the optical fiber connector. The reference normal passing through this reference abutment point is tilted with a predetermined angle of inclination with respect to the ferrule axis. Accordingly, when the ends of two ferrules are opposed to and abutted against each other, the convex spherical faces of these ferrules are abutted against each other at the reference abutment points to allow the abutment plane to secure that angle of inclination.

In the case where the cone axis of the tapered portion is parallel to the ferrule axis, the locus of the apex formed when it moves as the convex spherical face shifts under parallel movement of the abutment line (which can be obtained easily by the offset of the ferrule axis) can be obtained as a straight reference connector line passing through the reference abutment point and the cone apex of the tapered portion. Accordingly, when the position of the convex spherical face is changed (depending on the polishing depth when the ferrule is subjected to spherical polishing), the apex is expressed as the intersection between the abutment line moved parallel and the straight line, and the amount of offset can be indicated as the distance from the ferrule axis.

When the cone apex of the tapered portion is t- on the ferrule axis, the locus representing the moving locus of the reference abutment point coincides with the ferrule axis. Accordingly, offset in the reference abutment point can be totally eliminated irrespective of the depth of polishing.

BRIEF DESCRIPTION OF THE DRAWINGS

The features of the present invention that are believed to be novel are set forth with particularly in the appended claims. The invention, together with the objects and advantages thereof, may best be understood by reference to the following description of the presently preferred embodiments together with the accompanying drawings in which:

DETAILED DESCRIPTION OF THE PREFERRED EMBODIMENTS

Figure 1:
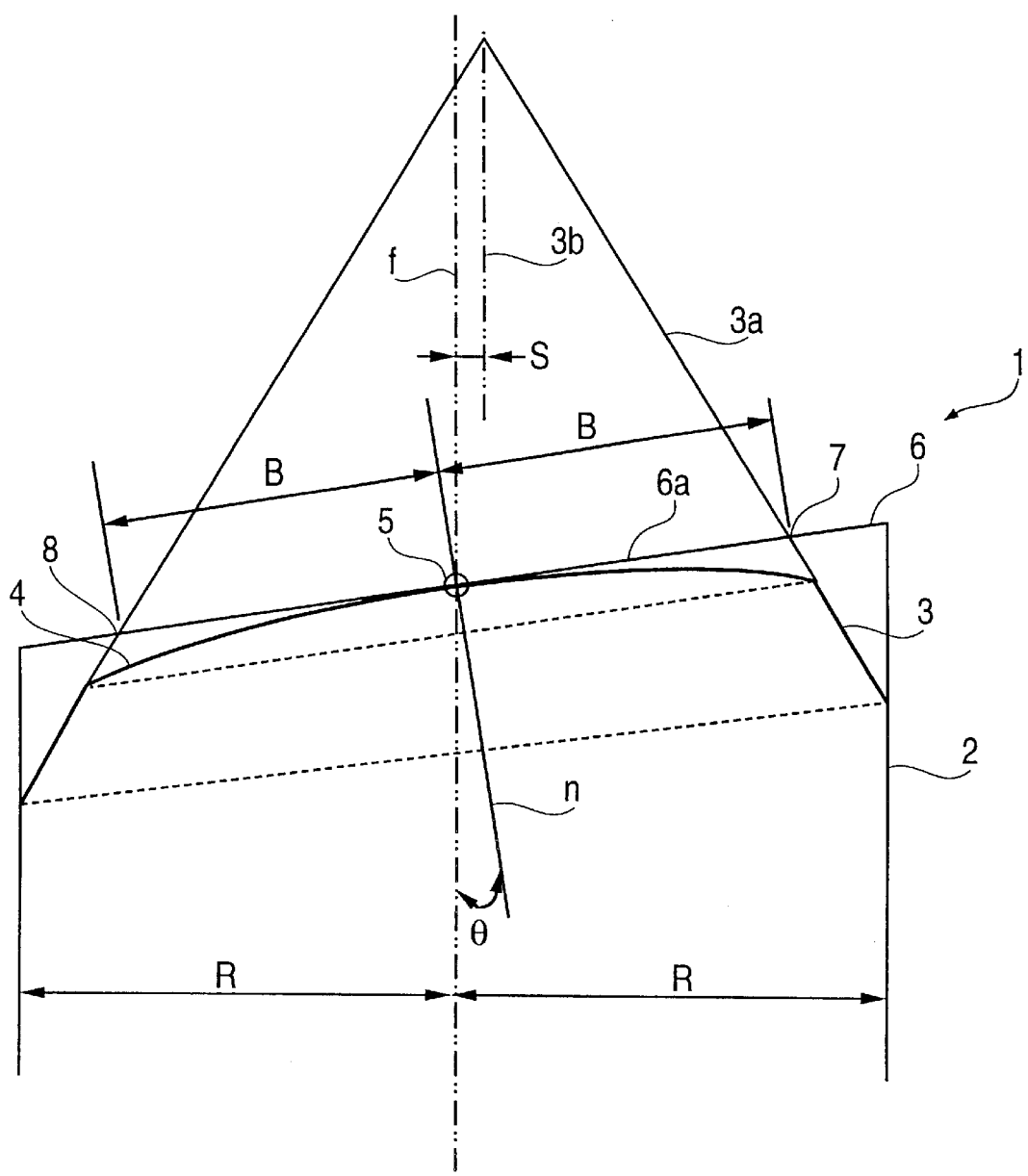
FIG. 1 is a cross-sectional view showing an and of the optical fiber connector according to the present invention.

FIG. 1 is a cross-sectional view showing an end of the optical fiber connector according to the present invention.

The end of the optical fiber connector 1 comprises a columnar ferrule 2 containing a through hole defined along the optical axis f thereof in which an optical fiber (not shown) is retained. The ferrule end has a convex spherical face 4 formed on a tapered portion 3 constituting a connection guide conical face.

A reference abutment point 5 at which this convex spherical face 4 is abutted against a counterpart of another connector to be combined therewith is taken as being on the ferrule axis f corresponding to the optical axis. The reference normal n which is the normal of the convex spherical face 4 at the reference abutment point 5 is fixed at a certain normal angle $\theta$ with respect to the ferrule axis f. The plane determined by the ferrule axis f and the reference normal n constitutes the cross-sectional position shown in FIG. 1 and is a symmetrical plane including the optical axis f of the optical fiber connector 1.

In the vertical cross section of the optical fiber connector 1 containing the ferrule axis f and the reference normal n described above, when the cone axis 3b of the tapered portion 3 is within this vertical cross section and a straight abutment line 6 corresponding to the abutment plane intersecting the reference normal n at the reference abutment point 5 is defined, a segment 6a is also defined. This segment 6a is defined as being surrounded by the imaginary conical face 3a of the tapered portion 3, i.e., the segment 6a is defined as being cut off at each side by the imaginary conical face 3a of the tapered portion 3 intersecting therewith at two points 7 and 8. The central point of the thus defined segment 6a is set as the reference abutment point 5.

Meanwhile, the slant trapezoid defined by the imaginary conical face 3a and the abutment plane 6 is formed at the end of the ferrule 2 as a reference shape and this reference shape is subjected to polishing using an elastic polishing plate to form the convex spherical face 4.

The polishing procedures are typically as follows. An abutment plane 6 having a fixed gradient and passing the reference abutment point 5 is formed at the end of a columnar ferrule 2, taking the machining loss such as by polishing into consideration. This is followed by polishing of the tapered portion at a predetermined angle to the ferrule axis f so as to satisfy the requirements described above to form a slant trapezoid at the end of the ferrule 2. This trapezoid as the reference we is subjected to polishing on an elastic polishing plate under a predetermine pressurizing force.

Polishing of the convex spherical face 4 is achieved with a conventional elastic polishing apparatus in which a diamond polishing fabric placed on an elastic plate is simultaneously rotated and revolved, or is achieved manually using a jig for holding the ferrule 2 at a predetermined angle on a fixed elastic polishing plate. Thereby, a polished spherical face having the reference abutment point 5 as the apex is formed. In this case, if the cone axis 3b of the tapered portion 3 is spaced away from and parallel to the ferrule axis f, the tapered portion 3 at the end of the ferrule 2 can be easily processed employing a processing jig for holding the ferrule 2 in an offset state.

Figure 2:
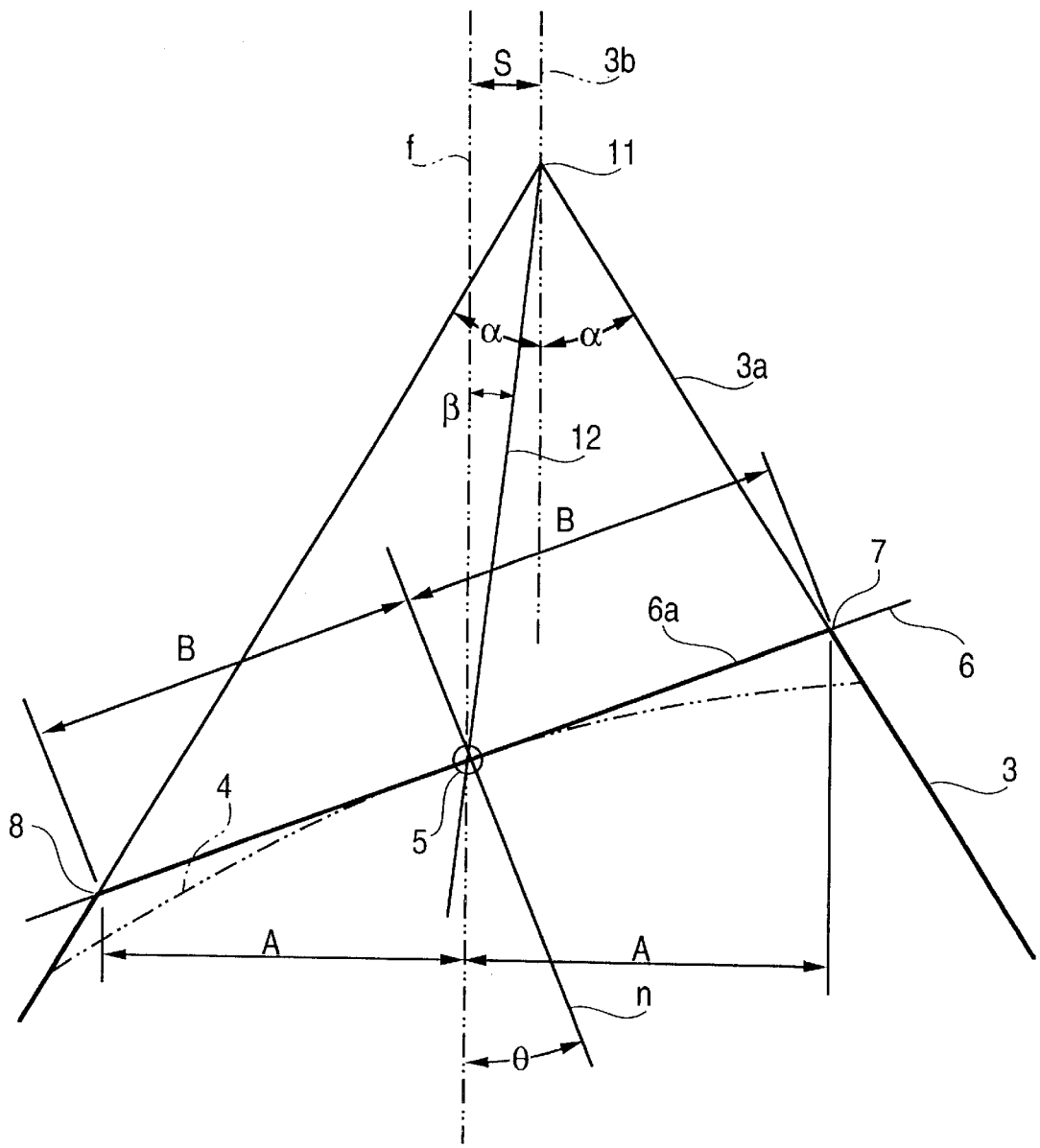
FIG. 2 is an analytical view showing the ferrule end shown in FIG. 1.
Figure 3:
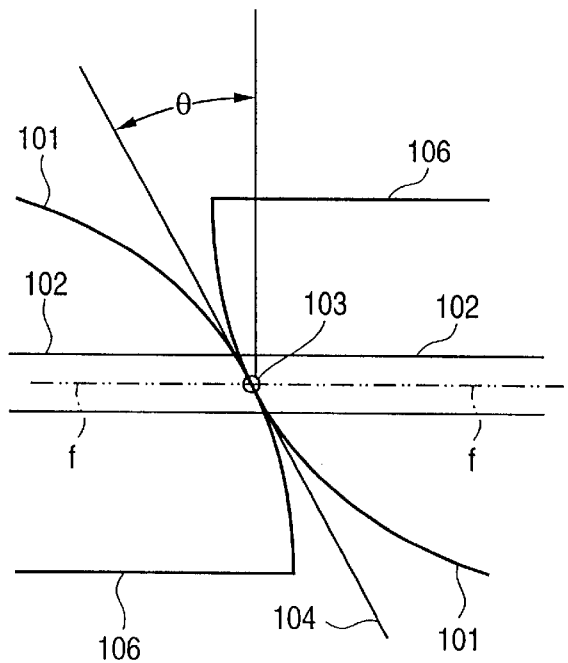
FIG. 3 is a partial view showing connector ends having slant spherical faces to be abutted against each other.
Figure 4:
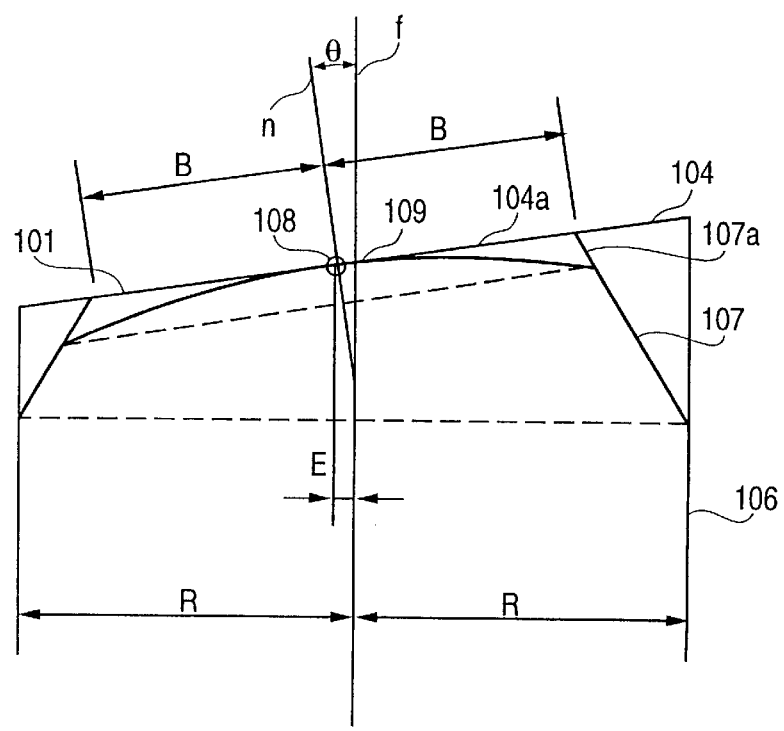
FIG. 4 is a cross-sectional view showing the connector end shown in FIG. 3 additionally having a tapered portion formed thereon.
Figure 5:
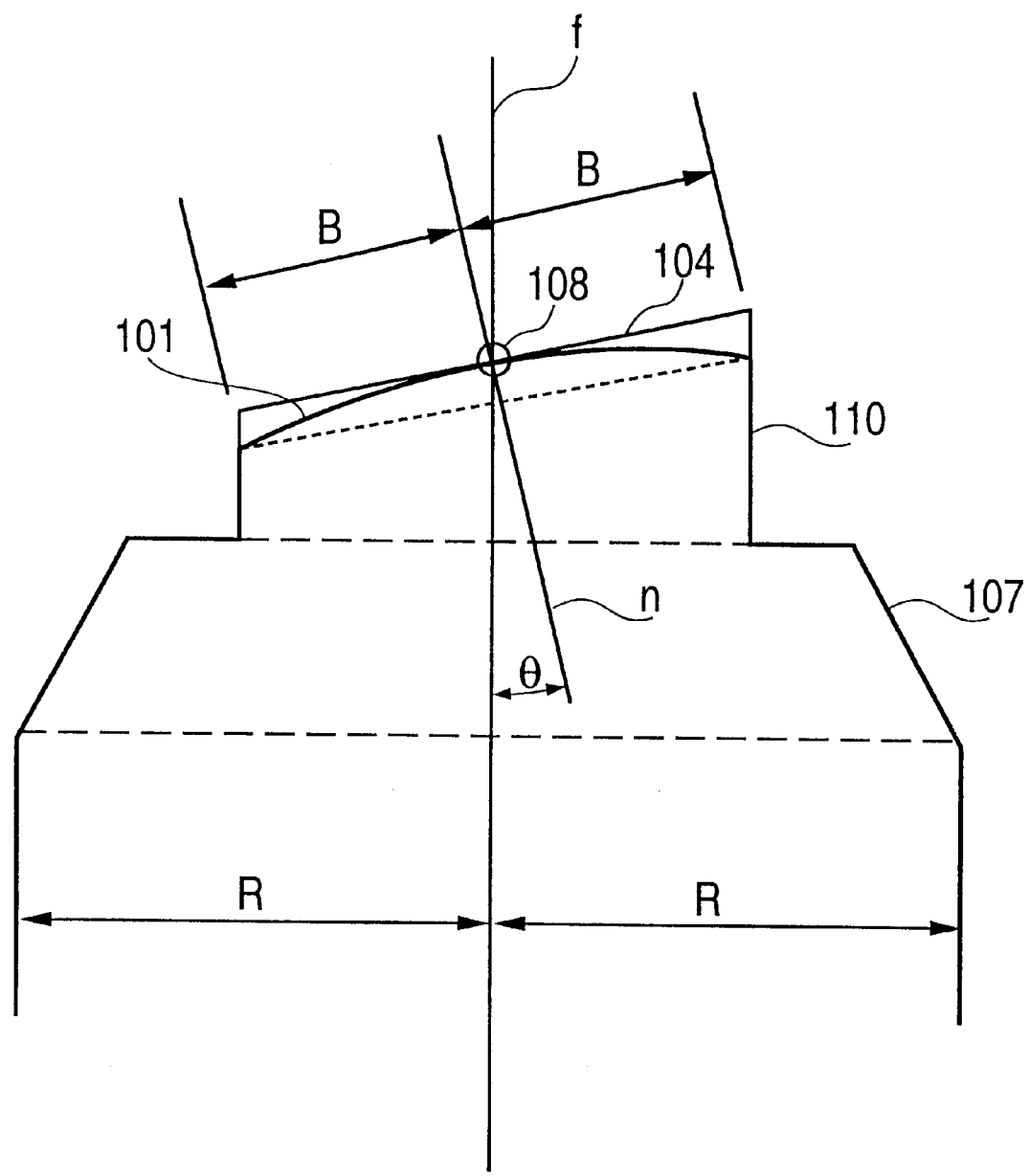
FIG. 5 is a cross-sectional view showing an exemplary constitution of the ferrule end having a reduced-diameter columnar portion formed thereon.

FIG. 2 is an analytical view of the shape of the ferrule end shown in FIG. 1. The reference abutment point S is shown on the straight line constituting the ferrule axis f of the optical fiber connector 1. The abutment line 6 intersects the reference normal n, which passes through the reference abutment point 5 and assumes a predetermined angle of inclination $\theta$ with respect to the ferrule axis f. The abutment line 6 represents the abutment plane passing through the reference abutment point 5 which is to be brought into contact with the convex spherical face 4.

The reference abutment point 5 is the central point of the segment 6a having a predetermined length 2B to be defined on the abutment line 6 by the intersections 7 and 8 with the imaginary conical face 3a of the tapered portion 3 heaving a cone apex angle of 2 $\alpha$. The cone axis 3b of the tapered portion 3 is spaced away from and parallel to the ferrule axis f.

Accordingly, when a spherical face is formed by subjecting the slant trapezoid, formed by the imaginary conical face 3a of the tapered portion 3 and the abutment plane 6 (constituting the slant face), to polishing as the reference shape, the resulting spherical face formed by polishing has that central point as the apex. Therefore, a convex spherical face 4 having the reference abutment point 5 as the apex can be formed.

Further, referring to a straight line 12 passing through the reference abutment point 5 and the cone apex 11 and assuming a fixed angle β of inclination with respect to the ferrule axis f, since the reference abutment point 5 corresponds to the central point between the two points 7 and 8, the central point constantly locates on the straight line 12 when the abutment line 6 is moved parallel. In other words, this straight line 12 corresponds to the locus along which the reference abutment point 5 moves.

This locus 12 represents the route of the apex which changes as the position of the spherical face changes, depending on the depth of polishing when a spherical face is formed using an elastic polishing plate based on the slant trepezoid as the reference shape. Since the amount of offset of the apex of the polished spherical face can be expressed as the distance between the ferrule axis f and the straight line 12, and since the apex moves away from the ferrule axis f along the locus 12 depending on the change in the position of the spherical face, any offset amount (due to polishing error) can be held minimum if the angle β formed by the ferrule axis f and the locus 12 is small. The offset amount will correspond to the polishing depth.

The above relationship will be analyzed quantitatively. Provided that the multiplication sign is *, the distance A from the ferrule axis f to the point 7 or 8 can be expressed by A=B*cos (θ), and the distance S between the cone axis 3b and the ferrule axis f is expressed by S=A*tan (θ) *tan (α). Provided that the square of the tangent is expressed by tan 2, the angle of inclination β Of the locus 12 of the reference abutment point can be expressed by tan (β)=tan (θ)*tan 2(α).

More typically, when θ8 deg and α=is 30 deg, S=A*O.0811, and tan (β)=0.0468. Therefore, we see that the tapered portion of the ferrule as provided by the present invention enables β to be less than the predetermined angle, θ. Thus, offset is minimized.

While the cone axis 3b of the tapered portion 3 is parallel to the ferrule axis f in the above embodiment, the cone apex 11 can be on the ferrule axis f. In this case, the locus of the reference abutment point 5 coincides with the ferrule axis f, and thus the reference abutment point 5 always stays on the ferrule axis f irrespective of the depth of polishing. Therefore, theoretical offset of the reference abutment point 5 can be totally eliminated.

Provided that the division sign is/, the cone apex position can be determined as an intersection of the ferrule axis f and a circle having a radius of B/sin (2 α) drawn on the normal n at the point B/tan (2 α) spaced outward from the reference abutment point 5.

As described above, since the optical fiber connector according to the present invention has a ferrule and configuration in which the center of the abutment plane surrounded by the conical surface of the tapered portion is on the ferrule axis, it contains reduced offset errors including the error in machining the convex spherical face at the ferrule end, and it can secure the angle of inclination of the abutment plane. Therefore, dimensional accuracy and stable transmission as required in ultra-high speed communication can be secured by easy machining procedures.

In the optical fiber connector according to the present invention, the central point of the segment which is defined as being on the abutment line intersecting the reference normal at the reference abutment point and being surrounded by the conical face of the tapered portion, is taken as being on the ferrule axis. If a spherical face is formed by polishing with an elastic polishing plate based on the slant trapezoid (as a reference shape) defined by the conical face of the tapered portion and the abutment plane (assuming a slant face) a spherical face having an apex at the central point of the segment (defined on the abutment line by being surrounded by the conical surface of the tapered portion) can be formed. Accordingly, a convex spherical face having an apex at the reference abutment point, i.e., a convex spherical face having the reference normal at the reference abutment point, can be obtained.

In the optical fiber connector described above, the reference abutment point is on the ferrule axis of the optical fiber connector. The reference normal passing through this reference abutment point is tilted with a predetermined angle of inclination with respect to the ferrule axis. Accordingly, when the ends of two ferrules are opposed to and abutted against each other, the convex spherical faces of these ferrules are abutted against each other at the reference abutment points to allow the abutment plane to secure that angle of inclination.

In the case where the cone axis of the tapered portion is parallel to the ferrule axis, the locus of the apex formed when it moves as the convex spherical face shifts under parallel movement of the abutment line (which can be obtained easily by the offset of the ferrule axes) can be obtained as a straight line passing through the reference abutment point and the con apex of the tapered portion. Accordingly, when the position of the convex spherical face is changed depending on the polishing depth when the ferrule is subjected to spherical polishing, the apex is expressed as the intersection between the abutment line moved parallel and the straight line, and the amount of offset can be indicated as the distance from the ferrule axis.

Therefore, a convex spherical face having an apex which is not offset from the reference abutment point can be formed by any conventional easy polishing procedures using an elastic polishing plate. Since the amount of offset of the apex caused by the change in the depth of polishing corresponds to the change in the depth of polishing, such off set quantity can be held to a minimum. Further, the tapered portion can be easily machined such that the cone axis may be offset from the ferrule axis to be parallel therewith.

As described above, due to its specific constitution, the present invention provides an optical fiber connector suitable for ultra-high speed communication having a ferrule end configuration which can be machined easily and can secure dimensional accuracy and stable transmission.

When the cone apex of the tapered portion is on the ferrule axis, the locus representing the moving locus of the reference abutment point coincides with the ferrule axis. Accordingly, offset in the reference abutment point can be totally eliminated irrespective of the depth of polishing.

Although only one embodiment of the present invention has been described herein, it should be apparent to those skilled in the art that the present invention may be embodied in many other specific forms without departing from the spirit or scope of the invention. Therefore, the present examples and embodiment are to be considered as illustrative and not restrictive, and the invention is not to be limited to the details given herein, but may be modified within the scope of the appended claims.

What is claimed is:

1. An optical fiber connector comprising:

a columnar ferrule having a through-hole for retaining an optical fiber, said ferrule having a ferrule axis;

said ferrule including a connection guide portion at an end thereof, said connection guide portion having a tapered portion forming a part of an imaginary conical face of an imaginary cone;

wherein a convex spherical surface is formed at an end of said tapered portion;

wherein a reference abutment point is defined as a point located on said convex spherical surface, the reference abutment point being located on the ferrule axis;

wherein a reference normal line of said convex spherical surface is defined as a straight line passing through the reference abutment point and intersecting the ferrule axis at a predetermined angle;

wherein a reference vertical cross-sectional plane is defined as a plane including the reference normal line and the ferrule axis;

wherein a cone central axis of the imaginary cone is placed in said reference vertical cross-sectional plane;

wherein a reference abutment line is defined as a line within the reference vertical cross-sectional plane, the reference abutment line being tangent to said convex spherical surface at the reference abutment point, the reference abutment line being perpendicular to the reference normal line, the reference abutment line having a reference abutment segment being a segment of the reference abutment line bordered by the imaginary conical face of the imaginary cone, the reference abutment segment having a central point located on the reference abutment point; and wherein a reference connection line is defined as a straight line within the reference vertical cross-sectional plane, the reference connection line connecting a cone apex of the imaginary cone and the central point, a reference connection angle being formed between the reference connection line and the ferrule axis, the reference connection angle being smaller than said predetermined angle.

2. The optical fiber connector of claim 1, wherein the vertical cross-sectional plane includes a reference slant trapezoid, the reference slant trapezoid being defined by said tapered portion of said ferrule, and an imaginary abutment plane including the abutment segment; wherein the reference slant trapezoid is a reference shape for forming said convex spherical surface by polishing.

3. The optical fiber connector of claim 1, wherein the cone central axis of the imaginary cone is parallel to the ferrule axis.

4. The optical fiber connector of claim 1, wherein the cone apex of the imaginary cone is located on the ferrule axis.

* * * * *